United States Patent Office 3,560,219
Patented Feb. 2, 1971

3,560,219
REMOVING LIPID MATERIAL FROM WHEY
Jerry M. Attebery, Minneapolis, Minn., assignor to Emery Carlton Swanson, Minneapolis, Minn.
No Drawing. Filed July 1, 1968, Ser. No. 741,270
Int. Cl. A23c 21/00
U.S. Cl. 99—57                                    13 Claims

ABSTRACT OF THE DISCLOSURE

A process for removing dissolved lipid material from an aqueous solution, particularly from solutions containing protein and/or lactose, by adding a divalent metal ion and adjusting the pH to a value above 6 at a temperature below 140° F., producing a lipid-containing precipitate, and separating this precipitate from the supernate liquid.

This invention relates to a process for the separation and removal of undesirable material, particularly lipid material, from mixtures thereof with lactose, protein or both and to the use of this process in conjunction with the recovery of valuable protein material by the use of molecular sieves. This invention also relates to a process for removing lipid material from a variety of mixtures, especially milk products such as cheddar cheese whey but also including wheys derived from other cheeses, e.g. cottage cheese, and non-cheese products.

At the present time considerable activity is taking place to effect a more efficient utilization of animal protein, including the recovery of animal protein from products formerly considered to be waste materials of little potential use. In the manufacture of cheese from milk, approximately half of the milk solids are coagulated as cheese, the remaining solids being contained in the residue or whey. Recovery of valuable protein from whey and removal of the undesirable whey constituents, such as salts, is difficult to accomplish in an economical and efficient manner. Recently developed processes which can effect protein separation in a palatable form include electrodialysis and selective separation by molecular sieve materials, as reported in Food Engineering, July 1967, and in U.S. 3,002,823. In these various processes the principal effort is to accomplish a separation between the protein fractions and the undesirable salts. Unfortunately, raw cheese whey also contains lactose and lipids, and the latter significantly lowers the efficiency of the recovery process, particularly when using molecular sieves to selectively entrap the salts and permit the larger protein molecules to pass through the mass of molecular sieve materials without occlusion and with a minimum of resistance to their movement. When beds of molecular sieve material are used, lipid materials apparently significantly decrease the efficiency of the bed and to hinder the movement of the protein molecules through the bed.

U.S. Pat. No. 2,606,181 (William J. Pratt and Frank H. Tinkler) describes the removal of lipid materials, characterized as casein-lipid complexes, from whey by adjusting the pH of the whey to the casein isoelectric point and adding a controlled amount of acid, preferably heating the whey to an elevated temperature which is below the lactose or lactalbumin coagulation point to speed up filtration, adding a filter aid and filtering through a precoated filter press. The pH is generally adjusted to the range of pH 4.0–5.2 and the whey is heated to a temperature in the range of 75°–150° F. According to this patent the precipitated casein-lipid complex contains approximately 75 percent protein and 25 percent ether-soluble lipids.

It is an object of this invention to provide a simple and efficient process for the removal of lipid material from whey without denaturation of the protein.

Another object of this invention is to provide a process for the removal of lipid material from raw cheese whey and the subsequent separation of protein by contacting the essentially lipid-free whey with suitable molecular sieve materials, membrane separation techniques, etc.

Still another object of this invention is to provide a process for the selective separation of lipid material from a mixture thereof with proteins and/or lactose.

A further object of this invention is to provide a process for the separation of lipid materials from mixtures thereof with protein and/or lactose without the necessity for using temperatures higher than ordinary room temperature.

In accordance with this invention it has been found that solubilized lipid (including lipoprotein and phospholipid complexes as well as lipids per se) may be removed from aqueous solutions thereof with proteins and/or lactose having a divalent metal ion concentration below about 0.075 molal by the addition of a divalent metal ion, such as calcium, preferably adding a sufficient quantity to raise the divalent ion concentration to at least .0750 molal, at temperatures below 140° F., preferably at approximately room temperature, and by the adjustment of the pH to a value above 6.0, preferably in the pH range of 7.0 to 7.5, thereby causing precipitation of lipid, separating the precipitate, and recovering the protein and/or lactose from the remaining liquid.

The preferred divalent metal ions which may be used in this process are divalent metals selected from Groups I, II, IV, VI and VIII of the Periodic Table, including metal such as copper, magnesium, calcium, zinc, strontium, cadmium, barium, tin, lead, iron, cobalt, and nickel. Those in Group II, e.g. calcium, and Group VIII are particularly preferred. Addition of these divalent metal ions is conveniently accomplished by adding those water soluble organic or inorganic salts which are non-toxic and preferably tasteless and colorless in low concentrations when the products are intended for use in foods. Illustrative salts include calcium acetate, calcium chloride, barium chloride, magnesium chloride, ferrous sulfate, lead acetate, copper sulfate, zinc chloride, stannous chloride, cobalt chloride, nickel chloride, etc. Although calcium ion data will now be presented and discussed for purpose of exemplification, it should be understood that the other divalent metal ions may also be employed.

The calcium ion concentration of raw cheddar cheese whey is approximately .025 molal. After the pH of such cheddar whey is adjusted to the range of pH 5.5–8.5, preferably to at least 7.0, the addition of calcium ion in increments provides successive yields of precipitate at room temperature. As the level of calcium ion approaches 0.075 molal (particularly .0875 molal) the weight yield of precipitate reaches a maximum after which further addition of calcium ion produces decreasing amounts of precipitate and essentially little additional benefit. It has been found that the precipitate at the varying increasing levels of calcium ion concentration has essentially the same ratio of the respective constituents, including lipid, nitrogen calculated as protein, ash, lactose and calcium. In addition, the weight yield of each of the constituents in the precipitate increases at increasing calcium ion concentration levels, at least until the total level of calcium ion reaches approximately 0.0875 molal. Accordingly, the weight percent yield of protein, lactose, ash and calcium ions as well as the lipid material, increase in the precipitate as the calcium ion level is increased.

The turbidity frequently observed with raw cheddar whey is due largely to the presence of extremely fine, well dispersed particles. These particles can be removed by clarification, such as by use of a high speed chamber bowl clarifier. Analysis of the removed particulate material indicates about 50 weight percent lipid and 30 weight percent protein. This preliminary removal of dispersed particles can be used to increase the efficiency of the divalent metal ion precipitation procedures of this invention and may permit the elimination of remaining lipid with a minimum addition of divalent metal ion, thus reducing the loss of protein and/or lactose in the precipitate formed during the precipitation process.

The supernatant remaining after removal of the precipitate formed in the divalent metal ion precipitation process can be concentrated to at least about 51 percent solids (preferably at least 58 percent solids) and introduced into the lactose and/or protein recovery steps. When such concentrated supernatant liquid is introduced into a bed of molecular sieve material or other separation equipment (e.g. electrodialysis, ultrafiltration membrane, etc.) to remove the salts and lower molecular weight materials, the protein recovered from the resulting effluent had excellent whipability at a level of 1.5 weight percent in water.

Some temperature dependence is noted in the divalent metal ion precipitation procedures of this invention. The yield of precipitate is lower at precipitation temperatures below about 68° F. At these lower temperatures the yield of other components is also depressed, due to the lower precipitate yield, but the ratio of most of the constituents remains constant. The ash and calcium contents are exceptions and appear to remain constant over the various temperatures (52°–140° F.). The increase in protein yield observed at temperatures of 140° F. and higher is apparently due to thermal decomposition or denaturation of the protein at these higher temperatures.

EFFECT OF DIVALENT METAL ION LEVEL

Tables I and II show the effect of divalent metal ion level (calcium in this case) on the qualitative and quantitative yield of precipitate and supernatant liquid from raw cheddar cheese whey (RCHW). These data were obtained by adjusting the pH of 2500 ml. of raw cheddar cheese whey to 4.6 from its initial pH of 5.8–6.0 with 50% HCl, raising the temperature to 126° F., adjusting the calcium ion level to the indicated level by adding calcium chloride, adjusting the pH to 7.0, and recovering and drying the precipitate formed.

ILLUSTRATIVE PRECIPITATION PROCEDURE 2500 ml. of raw cheddar cheese whey was adjusted to pH 7.0 from pH 5.85 by adding 8.4 ml. of 10% NaOH after raising the temperature to 73° F. Then 10.61 g. of $CaCl_2$ was added, and the pH (5.9) was adjusted to and maintained at pH 7.0 with 5.7 ml. of 10% NaOH. The calcium ion concentration was .0375 molal. After 20 minutes the mixture was clarified to separate the heavy flocculent white precipitate from the supernate. Repeating the above procedure without the addition of calcium ion produced essentially no precipitate. The pH of 2000 g. of the clarified supernate was adjusted to 5.8 with 50% HCl. Upon the addition of 3.83 g. of $CaCl_2$ and pH adjustment to 7.0 with 10% NaOH a small amount of white flocculent precipitate formed and was separated after 30 minutes. The calcium ion concentration was .0627 molal, assuming no loss in the precipitate. Taking 1638 g. of the last supernate and adjusting the pH to 5.65 with 50% HCl, 4.24 g. of $CaCl_2$ were added and 10% NaOH was introduced to raise the pH to 7.0 and maintain constant pH for 20 minutes. No precipitate formed. The calcium ion concentration was 0.101 molal. When the above procedures were duplicated with a monovalent metal salt, i.e. NaCl, substituted for the $CaCl_2$, no precipitate was formed.

In still another series of 5 runs, using 2500 ml. of raw cheddar cheese whey and the single precipitation procedure as described earlier, the effect of the divalent metal ion concentration (calcium in these data) is evident. The conditions utilized are given in Table III, and the precipitate recovery and composition are shown in Tables IV and V.

TABLE I

[Precipitate analyses]

| Precipitate component | RXN. Mixture Final $Ca^{2+}$ level (molal) | | | |
|---|---|---|---|---|
| | .0268 | .0420 | 0.0575 | 0.0718 |
| Total gm. of dry precipitate recovered from 2,500 ml. of original RCHW | ~0 | 8.9 | 12.2 | 13.2 |
| Protein: | | | | |
| Percent of precipitate | | 23.1 | 22.4 | 19.0 |
| Grams | | 2.06 | 2.73 | 2.51 |
| Ash: | | | | |
| Percent of precipitate | | 37.4 | 36.2 | 35.4 |
| Grams | | 3.32 | 4.42 | 4.67 |
| Lipid: | | | | |
| Percent of precipitate | | 6.63 | 4.7 | 4.56 |
| Grams | | 0.59 | 0.57 | 0.59 |
| Lactose: | | | | |
| Percent of precipitate | | 22.2 | 22.9 | 23.8 |
| Grams | | 1.98 | 2.79 | 3.14 |
| Calcium: | | | | |
| Percent of precipitate | | 15.8 | 12.9 | 11.3 |
| Grams | | 1.42 | 1.58 | 1.49 |
| Percent of total ash | | 43.6 | 35.8 | 31.8 |

TABLE II

[Supernatant Analyses]

| Component | RCHW | RXN. Mixture Final $Ca^{2+}$ level (molal) | | | |
|---|---|---|---|---|---|
| | | 0.0268 | 0.0420 | 0.0575 | 0.0718 |
| Solids: | | | | | |
| Percent | 6.61 | 6.74 | 6.66 | 6.69 | 6.79 |
| Grams $CaCl_2$ added | | | 4.32 | 8.69 | 12.69 |
| Grams RCHW solids plus grams $CaCl_2$ | 169.1 | 169.1 | 173.4 | 177.8 | 181.8 |
| Grams solids recovered from 2,250 ml. of supernate | | 154.4 | 152.0 | 153.6 | 157.5 |
| Grams percipitate recovered | | | 8.9 | 12.2 | 13.2 |
| Percent solids recovery | | 91.3 | 92.8 | 93.3 | 93.9 |
| Protein: | | | | | |
| Percent | 0.89 | 1.04 | 0.86 | 0.82 | 0.92 |
| Grams initial | 22.76 | 22.76 | 22.76 | 22.76 | 22.76 |
| Grams recovered in supernate | | 23.82 | 19.63 | 18.83 | 21.3 |
| Grams recovered in precipitate | | | 2.06 | 2.73 | 2.51 |
| Total grams recovered | | 23.82 | 21.69 | 21.56 | 23.81 |
| Percent protein recovery | | 104.7 | 95.3 | 94.7 | 104.5 |
| Lactose: | | | | | |
| Percent | 3.32 | 3.54 | 3.57 | 3.06 | 3.29 |
| Grams initial | 84.3 | 84.3 | 84.3 | 84.3 | 84.3 |
| Grams recovered in supernate | | 81.1 | 81.5 | 70.3 | 76.3 |
| Grams recovered in precipitate | | | 1.98 | 2.79 | 3.14 |
| Total grams recovered | | 81.1 | 83.5 | 73.1 | 79.4 |
| Percent lactose recovery | | 96.3 | 99.0 | 87.0 | 94.0 |

TABLE II—Continued

| Component | RCHW | RXN. Mixture Final Ca²⁺ level (molal) | | | |
|---|---|---|---|---|---|
| | | 0.0268 | 0.0420 | 0.0575 | 0.0718 |
| Ash: | | | | | |
| Percent | 0.37 | 0.39 | 0.49 | 0.58 | 0.69 |
| Grams initial | 9.94 | 9.94 | 9.94 | 9.94 | 9.94 |
| Grams CaCl₂ added | | | 4.32 | 8.69 | 12.69 |
| Total initial ash | | 9.94 | 14.26 | 18.63 | 22.63 |
| Grams recovered in supernate | | 8.58 | 11.23 | 13.24 | 15.84 |
| Grams recovered in precipitate | | | 3.32 | 4.42 | 4.67 |
| Total grams recovered | | 8.58 | 14.55 | 17.66 | 20.51 |
| Percent ash recovery | | 86.5 | 102.0 | 94.7 | 90.5 |
| Calcium: | | | | | |
| Grams initial | 2.73 | 2.73 | 2.73 | 2.73 | 2.73 |
| Grams added | | | 1.56 | 3.14 | 4.58 |
| Grams recovered in supernate | | 2.56 | 3.10 | 4.96 | 6.88 |
| Grams recovered in precipitate | | | 2.14 | 1.37 | 1.44 |
| Total grams recovered | | 2.56 | 5.24 | 6.33 | 8.32 |
| Total grams added | | 2.73 | 4.20 | 5.87 | 7.31 |
| Percent calcium recovered | | 94.0 | 122.0 | 108.0 | 114.0 |

TABLE III

| | Initial | | Reaction tempera- ture, °F. | Ml. 10% NaOH | | CaCl₂ | |
|---|---|---|---|---|---|---|---|
| | Tempera- ture, °F. | pH | | Adjust | Hold | Grams used | pH after added |
| Number: | | | | | | | |
| 1 | 52 | 5.60 | 86 | 6.83 | 1.82 | | |
| 2 | 50 | 5.55 | 74 | 9.31 | 3.92 | 3.9379 | 6.35 |
| 3 | 60 | 5.75 | 74 | 6.35 | 7.06 | 7.8583 | 6.20 |
| 4 | 56 | 5.65 | 74 | 7.34 | 7.65 | 11.7744 | 6.00 |
| 5 | 45 | 5.70 | 81 | 6.94 | 7.70 | 15.6536 | 5.80 |

TABLE IV

| | Final level of Ca²⁺ (molal) | Precipitate recovered from clarifier | | Percent solids remaining after subtract, percent moisture |
|---|---|---|---|---|
| | | Wet (gm.) | Dry (gm.) | |
| Sample: | | | | |
| 1 | .0267 | | 1.2088 | |
| 2 | .0407 | 39.4 | 8.5500 | 21.9 |
| 3 | .0545 | 73.0 | 13.4647 | 18.5 |
| 4 | .0683 | 84.8 | 15.6063 | 18.4 |
| 5 | .0822 | 93.6 | 16.9455 | 18.1 |

TABLE V

| | Final Ca²⁺ level (molal) | Obtained, grams dry precipitate | Protein | | Ash (gm.) | Ca²⁻ | | Ratio, in precipitate, gm. protein | |
|---|---|---|---|---|---|---|---|---|---|
| | | | Grams | Percent loss* | | Grams | Percent** | Gram, ash | Grams, Ca²⁺ |
| Number: | | | | | | | | | |
| 1 | .0267 | 1.21 | 0.394 | 1.8 | 0.498 | 0.197 | 7.3 | 0.79 | 2.00 |
| 2 | .0407 | 8.55 | 1.71 | 7.9 | 3.42 | 1.44 | 34.6 | .50 | 1.19 |
| 3 | .0545 | 13.5 | 2.26 | 9.9 | 4.98 | 2.04 | 36.8 | .45 | 1.11 |
| 4 | .0683 | 15.6 | 2.70 | 12.5 | 5.94 | 2.51 | 36.0 | .45 | 1.08 |
| 5 | .0822 | 16.9 | 2.76 | 12.7 | 6.15 | 2.60 | 31.2 | .45 | 1.06 |

*Percent loss indicates percent of original amount present in 2,500 ml. RCHW and lost to recovery by processing through precipitation.
**Percent of total amount of Ca²⁺ originally present in the reaction system which appears in the precipitate.

EFFECT OF pH ON PRECIPITATE

Precipitate formation upon addition of calcium ion increases with an increase in pH, although no advantages are obtained with pH values above about 8.0. Maximum precipitation is observed in the pH 7–8 range, as shown by the data in Table VI. These data were obtained by adjusting the pH of 2500 ml. of raw cheddar cheese whey to 4.5 with 4.0 ml. of 50% HCl. CaCl₂ (8.07 g.) was added, and 2.85 ml. of 10% NaOH was introduced to maintain a pH of 4.5. The temperature was raised from 48° F. to 80° F. in this procedure, and the final calcium ion level was .0286 molal. A number of 100 ml. samples of this reaction mixture were removed, each of which was then adjusted to the desired pH with 10% NaOH. After standing at least 20 minutes at room temperature the samples were centrifuged to separate the precipitated solids, and the recovered precipitates were dried and weighed. Similar observations apply to divalent metals other than calcium.

TABLE VI

[pH, dependence of precipitate yield]

| Final pH | Ml. 10% NaOH used in pH adjustment | Mg dry precipitate recovered |
|---|---|---|
| 4.45 | | 0 |
| 5.10 | 0.08 | 0 |
| 5.55 | .21 | 3.6 |
| 5.90 | .38 | 174.5 |
| 6.35 | | 330.9 |
| 6.65 | .60 | 400.5 |
| 7.30 | .70 | 425.2 |
| 7.05 | .65 | 443.1 |
| 7.55 | .74 | 482.1 |
| 8.40 | .80 | 479.4 |
| 9.20 | .82 | 462.9 |
| 10.0 | | 437.5 |

EFFECT OF PRE-CLARIFICATION

Many raw cheese wheys have a turbid appearance due to suspended material of very small particle size. In raw cheddar cheese whey this suspended material contains about 50% lipid and about 30% protein. Removal of this suspended matter, such as by clarification, centrifugation, etc., produces a clear liquid which is particularly suitable for the precipitation process of this invention. Generally, the removal of lipid in such a pre-clarification step permits the addition of lower amounts of divalent metal ion to accomplish an equivalent lipid separation. In the case of raw cheddar cheese whey lipid precipitated from a pre-clarified whey was 0.175–0.275 g. per 2500 ml. of whey liquid irrespective of the amount of the additional calcium ion added, and the total amount of lipid removed from the pre-clarification and the calcium ion addition steps was comparable to the lipid removed from raw cheddar cheese whey (un-clarified) after adding calcium ion to a level of about 0.0750 molal in the procedure described earlier.

COMPARATIVE EFFECTIVENESS OF ILLUSTRATIVE METAL IONS

Table VII illustrates the relative effectiveness of various divalent metal ions and some common monovalent and trivalent metal ions in forming a lipid-containing precipitate from cheese whey. After 1500 ml. of cheddar cheese whey was heated from the initial temperature to the reaction temperature and the pH was adjusted to 7.0 with 10% NaOH, the metal salt was weighed and added to the whey with constant vigorous agitation. The pH was again adjusted to 7.0 with 10% NaOH after the salt was completely dissolved. After 15 minutes under these reaction conditions, any precipitate formed was removed by clarification at high speed in a chamber bowl clarifier and oven dried. In determining the amount of each salt to add to the 1500 ml. whey sample, $CaCl_2$ was taken as the standard. Based on the weight of calcium added and the atomic weights, the weight required to provide the same number of atoms was calculated for each metal. The amount of each salt required to produce this weight was then used for the addition. Analysis of the precipitates formed with the addition of various divalent metal ions is given in Table VIII. It will be seen that lipid is precipitated along with a small fraction of the total protein present. This minor loss of protein is not objectionable, particularly when the mixtures being used are relatively low cost by-products, such as cheese whey.

Although the process of this invention has been particularly described in relation to its use in a preferred embodiment for treating raw cheddar cheese whey, it is equally valuable and applicable in connection with other wheys, e.g. cottage cheese whey, having a calcium ion level below about .0875 molal and various mixtures of lipids with proteins and/or lactose. When the molecular sieve process is used for protein separation, the lower lipid concentration in the feed produces an increased molecular sieve bed efficiency which more than offsets the somewhat higher divalent metal ion levels, thereby enhancing the commercial attractiveness of such processes for recovering protein from waste materials, such as cheese whey.

Various other embodiments of the present invention will be apparent to those skilled in the art without departing from the scope thereof.

TABLE VII

[Reaction conditions for precipitate formation]

| Salt used | Gram added | Ml. 10% NaOH To adjust pH 7.0 | Ml. 10% NaOH To hold pH 7.0 | Initial Temperature, °F. | Initial pH | Reaction temperature, °F. | Precipitate formed |
|---|---|---|---|---|---|---|---|
| NaCl | 5.07 | 3.57 | | 49 | 5.8 | 69 | No. |
| KAc | 8.72 | 3.89 | | 55 | 5.8 | 55 | No. |
| KCl | 9.77 | 4.0 | 0.85 | 53 | 5.8 | 78 | No. |
| NaLac | 11.7 | 5.0 | 24.92 | 72 | 5.7 | 72 | No. |
| $CaAc_2$ | 7.26 | 2.78 | 3.82 | 55 | 5.9 | 70 | Yes. |
| $BaCl_2$ | 10.61 | 4.0 | 3.07 | 51 | 5.8 | 70 | Yes. |
| $FeSO_4$ | 12.26 | 15.0 | 8.9 | 42 | 4.5 | 100 | Yes. |
| $Al_2(SO_4)_3$ | 8.13 | 13.6 | 10.0 | 45 | 4.7 | 72 | No. |
| $PbAc_2$ | 16.34 | 15.1 | 7.45 | 41 | 4.4 | 74 | Yes. |
| $FeCl_3$ | 12.02 | 14.0 | 25.6 | 52 | 4.7 | 80 | No. |
| $CuSO_4$ | 11.67 | 14.0 | 15.0 | 40 | 4.4 | 74 | Yes. |
| $ZnCl_2$ | 6.55 | 15.3 | 12.0 | 40 | 4.3 | 74 | Yes. |
| $SnCl_2$ | 8.41 | 17.2 | 18.95 | 40 | 4.4 | 76 | Yes. |
| $CoCl_2$ | 10.76 | 14.0 | 12.0 | 48 | 4.0 | 80 | Yes. |
| $NiCl_2$ | 11.79 | 14.0 | 10.0 | 48 | 4.0 | 80 | Yes. |

TABLE VIII

[Analysis of precipitates formed]

| Salt used | Grams obtained from 1,500 ml. CHW | | | | |
|---|---|---|---|---|---|
| | Precipitate formed | Protein | Lipid | Ash | Unanalyzed |
| $CaAc_2$ | 7.28 | 1.39 | *0.17 | **2.77 | 1.86 |
| $CaCl_2$ | 8.08 | 1.36 | *0.24 | **2.99 | 2.27 |
| $BaCl_2$ | 10.77 | 1.53 | *0.25 | 5.38 | 3.60 |
| $MgCl_2$ | 6.24 | 1.10 | 0.46 | 2.27 | 2.41 |
| $FeSO_4$ | 10.08 | 2.06 | 0.39 | 4.54 | 3.07 |
| $PbAc_2$ | 17.72 | 2.58 | 0.64 | 11.52 | 2.94 |
| $CuSO_4$ | 9.54 | 2.39 | 0.36 | 3.55 | 3.25 |
| $ZnCl_2$ | 10.34 | 3.17 | 0.46 | 4.35 | 2.38 |
| $SnCl_2$ | 12.05 | 1.69 | 0.44 | 8.03 | 1.89 |
| $CoCl_2$ | 10.14 | 2.09 | 0.42 | 4.03 | 3.60 |
| $NiCl_2$ | 11.98 | 3.17 | 0.43 | 3.67 | 4.71 |

*Whey samples were pre-clarified with a chamber bowl clarifier run at maximum speed before the salt addition.

**Calcium determinations made in ash samples accounted for 15.0% of precipitate weight.

What is claimed is:

1. A process for removing dissolved lipid from aqueous whey which comprises adding sufficient divalent metal ion selected from the metals of Groups I, II, IV, VI and VIII of the Periodic Table to an aqueous whey solution containing a solubilized lipid and having less than 0.0750 molal of said divalent metal ion to increase said divalent metal ion concentration by at least 0.014 molal and adjusting the pH to a value between 6 and 8.5 at a temperature below 140° F., thereby producing a lipid-containing precipitate, and separating said precipitate from the supernate liquid.

2. A process for removing solubilized lipid from an aqueous whey solution thereof having solubilized therein protein, lactose or both and having less than 0.0750 molal divalent metal ion selected from the group consisting of copper, magnesium, calcium, zinc, strontium, cadmium, barium, tin, lead, iron, cobalt and nickel, said process consisting essentially of adding sufficient of said divalent metal ion to said solution to increase said divalent metal ion concentration by at least 0.014 molal and adjusting the pH to a value between 6 and 8.5 at a temperature below 140° F., thereby producing a lipid-containing precipitate, and separating said precipitate from the supernate liquid.

3. The process of claim 2 in which said divalent metal ion is added until the divalent metal ion level is at least about 0.0750 molal.

4. The process of claim 2 in which said divalent metal ion addition is made prior to said pH adjustment.

5. The process of claim 2 in which said pH adjustment is made prior to said divalent metal ion addition.

6. The process of claim 2 in which said aqueous whey solution is a milk product.

7. The process of claim 6 in which said aqueous whey solution is a cheese whey.

8. The process of claim 7 in which said aqueous whey solution is a cheddar cheese whey.

9. The process of claim 7 in which said cheese whey is first clarified to remove suspended material.

10. The process of claim 2 in which said supernate liquid is treated to separate salts therefrom.

11. The process of claim 2 in which the divalent metal ion added is added as a water soluble salt.

12. The process of claim 2 in which the divalent metal ion added is calcium.

13. The process of claim 7 in which said aqueous whey solution is a cottage cheese whey.

References Cited

UNITED STATES PATENTS

| 1,787,754 | 1/1931 | Meyer | 99—57 |
| 2,606,181 | 8/1952 | Pratt et al. | 99—57X |
| 2,708,166 | 5/1955 | Tumerman et al. | 99—57 |
| 2,765,232 | 10/1956 | Rodgers et al. | 99—57 |
| 3,447,930 | 6/1969 | Francis | 99—57 |

LIONEL M. SHAPIRO, Primary Examiner

D. M. NAFF, Assistant Examiner

U.S. Cl. X.R.

99—62